Patented Feb. 7, 1939

2,146,240

UNITED STATES PATENT OFFICE 2,146,240

METHOD OF PREPARING A LOW-EXTRACT BEER

Max Thomas, Stassfurt, Germany

No Drawing. Application March 3, 1936, Serial No. 66,799. In Germany March 12, 1935

7 Claims. (Cl. 99—38)

The present invention relates to a process for brewing a special beer, in particular for diabetic and corpulent subjects.

As is well known any normal finish-fermented beer still contains a certain amount of extract, which consists essentially of maltose, dextrins, albuminous bodies and mineral salts.

For example 100 gms. of a usual pale lager beer brewed from a say 12% wort contain 5.56 gms. i. e. 5.56% of actual extract.

This extract consists essentially of the following ingredients:

| | Percent |
|---|---|
| Albumen | 0.45 |
| Ash | 0.19 |
| Carbohydrates | 4.83 |

The object of the present invention is to reduce the extract content of the finished beer without undesirably affecting the other essential and characteristic qualities. If there is to be no general reduction in value of the beer it is not possible to reduce the extract content of the wort as such, which would merely lead to an absolute but not a relative reduction of the extract content of the finished beer; the wort content must be maintained within the usual limits for draught, lager and export beer.

The process of the invention is concerned chiefly with worts having an extract content of up to about 14%; in making beer for diabetic and corpulent subjects a wort with not too high a content of extract will be used.

In order to reduce the actual extract in the finished beer for the purpose set forth, according to the invention wort advantageousely containing only up to about 14% of extract is fermented not only with normal yeast (Saccharomyces cerevisiae) but also with a micro-organism which also ferments dextrin, such as Schizosaccharomyces pombe; the normal brewer's yeast (Saccharomyces cerevisiae) as is known does not ferment dextrin, while certain micro-organisms (Schizosaccharomyces pombe, Saccharomyces thermantitonum) attack this group of substances. It should here be mentioned that the process is not limited to the use of barley malt, but that wheat malt, oat malt and the like can be used; the incorporation of so-called raw cereal such as rice and maize is also possible without special measures.

By the combination of these two micro-organisms it is possible to reduce the dextrin content of the finished beer very considerably as compared with beer brewed from wort of the same strength fermented in the usual way with Saccharomyces cerevisiae alone.

The two micro-organisms can be used straight away together; it is also possible however to work in stages, the main fermentation with Saccharomyces cerevisiae being first effected and then an additional fermentation with Schizosaccharomyces pombe.

In the case of the example given above the actual extract can without difficulty be reduced to for instance 2.3% by the process according to the invention.

Tests have shown that a very considerable effect in the sense of the invention can be obtained by the above described fermenting process alone, a normal wort of usual strength being used.

For making a special beer for diabetic and corpulent subjects, it has further been found advantageous to adopt measures before the actual fermentation, which are specially directed to the end in view.

Advantageously a barley poor in albumen is used. In known way a well modified and low kilned pale malt is made; the latter is then treated by known processes which produce a wort poor in dextrin and albumen but rich in maltose (by the infusion process, or three mash decoction process, if necessary with the addition of diastase extract).

In other words all known brewing steps which are designed to reduce the albumen in the wort and which affect the maltose : dextrose ratio to the advantage of the maltose can be used in making the special beer according to the invention, in order to produce a wort specially adapted for the end product, before fermenting is commenced.

Since as is known strong hopping leads to intensive deposition of albumen, the wort is strongly hopped, for example 0.5 kg. per hectolitre.

Example

Barley poor in albumen is well modified during cold flooring and is kilned at low temperature. The crushed malt is mashed at 50° C. and held at this temperature for two hours. The temperature is then gradually raised to 55° C., aqueous diastase solution added, the temperature raised in steps to 70° C. and final sugaring effected. Returning of the final boiled part of the wort from the copper to the mash tun, drawing off and boiling of the wort with a heavy addition of hops follow in the usual manner. The wort so obtained, after cooling is fermented with Saccharomyces cerevisiae at the usual fermenting cellar temperature and after the main fermentation the yeast replaced with *Schizosaccharomyces pombe* and final fermentation effected at somewhat higher temperature, for example 16° C.

It should be mentioned that double fermentation processes are per se known. For example it has been proposed to remove wholly or in part the still floating and not deposited yeast from the beer before the final filtration usual at the end of lagering, by mechanical clarification and then continue the fermentation process with fresh active yeast.

Double fermentation processes have also been used for other fermented liquids such as berry and fruit wines, for example by destroying all micro-organisms by sterilization after the main fermentation and commencing a second fermentation with some desired fermenting agent.

None of the known processes has the purpose of reducing the extract content of the finished beer, by the use of a micro-organism which ferments dextrin, to such an extent that the beer becomes suitable for consumption by diabetic and corpulent subjects.

What I claim is:—

1. The method of preparing a low-extract beer suitable for consumption by diabetics which comprises preparing a wort having an extract content not in excess of about 14%, and fermenting said wort with *Saccharomyces cerevisiae* and a yeast selected from the group consisting of *Schizosaccharomyces pombe* and *Saccharomyces thermantitonum* to produce a finished beer having an extract content materially below that of a normally brewed beer from the same wort, but possessing the essential and characteristic qualities of such a normally brewed beer.

2. The method of preparing a low-extract beer suitable for consumption by diabetics which comprises preparing a wort having an extract content not in excess of about 14% and as high a maltose:dextrin ratio as can be obtained by conventional malting and mashing procedure, and fermenting said wort with *Saccharomyces cerevisiae* and a yeast selected from the group consisting of *Schizosaccharomyces pombe* and *Saccharomyces thermantitonum* to produce a finished beer having an extract content materially below that of a normally brewed beer from the same wort, but possessing the essential and characteristic qualities of such a normally brewed beer.

3. The method of preparing a low-extract beer suitable for consumption by diabetics which comprises preparing a wort having an extract content not in excess of about 14% and as high a maltose:dextrin ratio and as low an albumen content as can be obtained by conventional malting and mashing procedure, and fermenting said wort with *Saccharomyces cerevisiae* and a yeast selected from the group consisting of *Schizosaccharomyces pombe* and *Saccharomyces thermantitonum* to produce a finished beer having an extract content materially below that of a normally brewed beer from the same wort, but possessing the essential and characteristic qualities of such a normally brewed beer.

4. The method of preparing a low-extract beer suitable for consumption by diabetics which comprises preparing a wort having an extract content not in excess of about 14% and as high a maltose:dextrin ratio as can be obtained by conventional malting and mashing procedure, and fermenting said wort with *Saccharomyces cerevisiae* and then with a yeast selected from the group consisting of *Schizosaccharomyces pombe* and *Saccharomyces thermantitonum* to produce a finished beer having an extract content materially below that of a normally brewed beer from the same wort, but possessing the essential and characteristic qualities of such a normally brewed beer.

5. The method of preparing a low-extract beer suitable for consumption by diabetics which comprises preparing a wort having an extract content not in excess of about 14% and as high a maltose:dextrin ratio as can be obtained by conventional malting and mashing procedure, and fermenting said wort with *Saccharomyces cerevisiae* and a yeast selected from the group consisting of *Schizosaccharomyces pombe* and *Saccharomyces thermantitonum* to produce a finished beer having an extract content materially below that of a normally brewed beer from the same wort and of the order of 2.3%, but possessing the essential and characteristic qualities of such a normally brewed beer.

6. The method of preparing a low-extract beer suitable for consumption by diabetics which comprises preparing a wort having an extract content not in excess of about 14% and as high a maltose:dextrin ratio as can be obtained by conventional malting and mashing procedure, and fermenting said wort with *Saccharomyces cerevisiae* and *Schizosaccharomyces pombe* to produce a finished beer having an extract content materially below that of a normally brewed beer from the same wort, but possessing the essential and characteristic qualities of such a normally brewed beer.

7. The method of preparing a low-extract beer suitable for consumption by diabetics which comprises preparing a wort having an extract content not in excess of about 14% and as high a maltose:dextrin ratio as can be obtained by conventional malting and mashing procedure, and fermenting said wort with *Saccharomyces cerevisiae* and then with *Schizosaccharomyces pombe* to produce a finished beer having an extract content materially below that of a normally brewed beer from the same wort, but possessing the essential and characteristic qualities of such a normally brewed beer.

MAX THOMAS.